June 24, 1952  L. M. COTCHETT ET AL  2,601,371
OILLESS BEARING FOR TEXTILE AND OTHER MACHINES
Filed March 26, 1948

Inventors.
Louis M. Cotchett and
Robert Rulon-Miller
By Synnington White
Attorneys.

Patented June 24, 1952

2,601,371

UNITED STATES PATENT OFFICE 2,601,371

OILLESS BEARING FOR TEXTILE AND OTHER MACHINES

Louis M. Cotchett, Whitman, Mass., and Robert Rulon-Miller, Bristol, R. I., assignors to Dixon Lubricating Saddle Company, Bristol, R. I., a corporation of Rhode Island Application March 26, 1948, Serial No. 17,234

6 Claims. (Cl. 19—134)

This invention relates to improvements in machine bearings for general use and more particularly as applied to the bearings for the gudgeons of the top-rolls on such machines as spinning frames and the like.

One object of the invention is to provide replaceable, oilless bearings readily attachable to the cap-bars of spinning frames and like machines and adapted for receiving the gudgeons of the top-rolls in such machines.

Another object is to provide attachable bearing elements of the type indicated which may be applied to standard forms of cap-bars already in use to reduce wear and extend the life of the bearings practically indefinitely.

Another object is to provide attachable bearing elements for the cap-bars which may be removed when worn and replaced by others of the same type with the substitution easily accomplished in the mill without the use of tools except a screw-driver.

Another object is to provide an improved bearing unit of novel form constructed from antifriction material requiring no lubrication and resistant to wear over long periods of use.

Further objects of the invention are set forth in the following specification which describes a preferred form of construction of the bearing elements and the improved means for removably attaching them to the standard parts of spinning frames or like machines as illustrated by the accompanying drawing. In the drawing.

Various types of machines having rotating elements are provided with spaced bearing surfaces for contact with rotary shafts, spindles, gudgeons and the like and the present improved oilless bearings are adapted for such use. The present specification illustrates the improved bearings as applied to use with the cap-bars for supporting the top-rolls of spinning and like machines and in accordance with the improvement the removable bearings are constructed of a distinctive type of material having friction-reducing and extraordinary wear-resisting characteristics. For such purpose the invention contemplates the use of attachable bearing units made wholly or in part of a material having a hardness substantially equal to a Rockwell hardness of 90–95 on the M scale. One such material, for example, is a synthetic linear super polymer or synthetic linear polyamide polymer described in United States Letters Patent No. 2,130,948, issued September 20, 1938, to Carothers. No claim is made herein to the polymer, per se, the present invention being directed to bearing units made in whole or in part from said polymer identified by the name nylon. The bearing elements may be cast, molded or cut from a strip of the specified material, the details of such methods of manufacture being well known and therefore not herein described.

Figure 1:
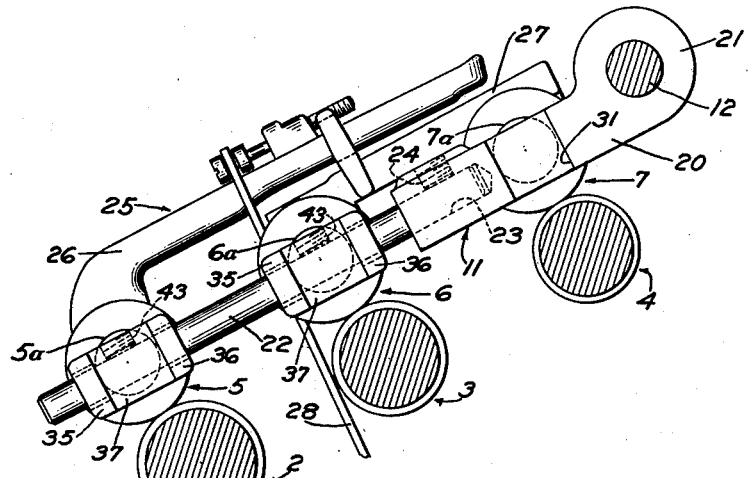
Fig. 1 is a side elevational view of a set of top and bottom drafting rolls with the bottom rolls shown in transverse section and illustrating one of the cap-bars for supporting the top-rolls in peripheral contact with the bottom rolls.

Referring to Fig. 1 of the present drawing, a set of conventional drafting rolls is herein shown with the gudgeons of the top-rolls supported in bearings in cap-bars, only one of which is illustrated. The set of rolls comprises a bottom front roll 2, a bottom middle roll 3, and a bottom back roll 4, with corresponding top rolls 5, 6 and 7 supported thereabove for cooperation with the peripheries of the bottom rolls. In accordance with the usual arrangement, the bottom rolls are journaled in fixed bearings on the frame of the machine (not herein shown), while the top-rolls 5, 6 and 7 have end gudgeons 5a, 6a and 7a, see Fig. 2, slidably journaled in spaced slots in the cap-bars which are arranged in series along the frame of the machine.

Figure 2:
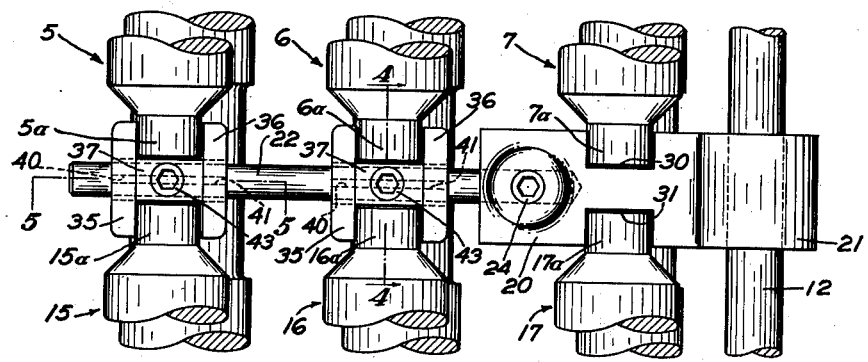
Fig. 2 is a plan view of the same.
Figure 3:
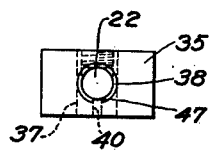
Fig. 3 is a side elevational view of one of the bearing elements shown as assembled with the spacer-block.

It will be understood that the top-rolls are arranged in series in axial alinement extending the length of the frame of the machine, Fig. 2 illustrating only two sets comprising the top-rolls 5, 6 and 7 and the corresponding top-rolls 15, 16 and 17 disposed in axial alinement therewith. The top-rolls 5, 6 and 7 are provided with end gudgeons 5a, 6a and 7a, respectively, while the top-rolls 15, 16 and 17 have end gudgeons 15a, 16a and 17a, respectively. Only a portion of each top-roll is shown in the plan view, Fig. 2, that is, their enlarged bosses are represented as broken away to save space on the sheet; it being understood that each roll comprises a pair of such bosses for contact with the bottom rolls as illustrated more in detail in our prior application, Serial No. 4,678, filed January 27, 1948.

The cap-bar 11 as herein shown is of conventional type, a series of these elements being fixedly supported on a horizontal rod 12. Each cap-bar may comprise a cast-iron arm 20 having a hub 21 bored transversely for receiving the supporting rod 12 and usually provided with a rod-extension 22 for carrying spaced bearings secured thereto by suitable means. The rod 22 may be held in a bore 23 at the end of the arm 20 and fastened in place by a set-screw 24. In accordance with the usual construction, the bearings on the cap-bars 11 receive the end gudgeons 5a, 6a and 7a of the top-rolls 5, 6 and 7, and also the gudgeons 15a, 16a and 17a for the corresponding rolls 15, 16 and 17. In this manner the top-rolls are supported with their bosses in contact with the peripheries of the bottom rolls 2, 3 and 4 to draft the fibers feeding between the rolls.

The top-rolls are caused to cooperate with the bottom rolls by means of a weighted saddle-assembly 25. The saddle-assembly may be of any suitable type, but as herein shown it is of the preferred construction described in our prior application for patent Serial No. 4,678, referred to above. This form of saddle-assembly comprises a front saddle 26 with a back saddle 27 jointed thereto for relative movement, and weighted by means of a stirrup 28 depending therefrom and connected to a lever carrying suitable weights; these elements not being shown in detail herein as they form no part of the present invention.

In accordance with the conventional form of cap-bar 11, as herein shown, the arm 20 is provided with slots 30 and 31 in its sides for receiving the gudgeons 7a and 17a of the back top-rolls 7 and 17. In the present construction this form of bearing for the back top rolls is retained as these particular rolls do not run heavily weighted and therefore the wear on their gudgeons is not extreme or critical. As herein disclosed, therefore, the present novel form of bearing is applied only to the front top-rolls and middle top-rolls although if desired such bearings may be used for the back top-rolls without material change in the construction of the cap-bar.

Figures 6, 7:
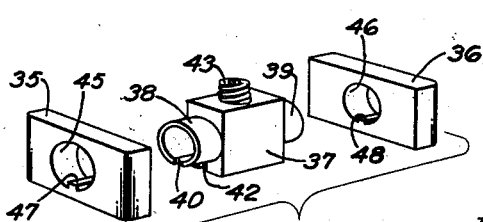
Fig. 6 is a composite perspective view showing a pair of disassembled bearing elements and the connecting means for normally holding them in spaced-apart relationship.
Fig. 7 is an enlarged perspective view of one of the bearing elements shown as of modified construction comprising a metal core faced with laminations of wear-resistant material.

The present improved bearings may be all of the same form, each comprising three elements, two of which are in the shape of plinths or flat blocks 35 and 36 held in spaced relationship by means of a connector or spacer-block 37, see Fig. 6. The two elements 35 and 36 constituting the bearing proper are constructed from the material referred to above as nylon or similar material having the specified Rockwell hardness of 90-95 on the M scale; whereas, the connector or spacer-block 37 may be made of metal such as brass, cast-iron or steel.

Figures 4, 5:
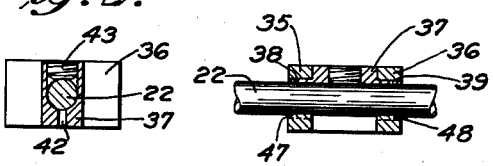
Fig. 4 is a transverse sectional view of the same taken on line 4—4 of Fig. 2.
Fig. 5 is a sectional view of two assembled bearing elements taken on line 5—5 of Fig. 2 and showing the means for connecting said elements in spaced-apart relationship.

The connector or spacer-block 37 is provided with annular flanges or bushings 38 and 39 projecting from either end thereof. Preferably, these bushings 38 and 39 are made integral with the block 37, although they may be constructed separate therefrom and inserted in bores in the ends of the blocks. The bushings 38 and 39 are slotted on the bottom at 40 and 41, respectively, and these slots are extended through the bottom of the block as indicated at 42 in Figs. 4 and 6. A set-screw 43, preferably of the type having a hexagonal socket in its end and known by the trade-name of "Allen" screw, is threaded through the top of the block 37 for engagement with the rod 22 to fasten the block to the rod in the proper location on the cap-bar 11. The bearing elements 35 and 36 have bores 45 and 46 extending transversely therethrough and of a diameter to adapt them to receive the projecting annular flanges or bushings 38 and 39 on the spacer-block 37. The bottom of the bores 45 and 46 are formed with projecting splines or keys 47 and 48 adapted to engage in the slots 40 and 41 in the bushings 38 and 39 to prevent the bearing elements 35 and 36 from turning thereon when assembled in place at the ends of the spacer-block 37. Thus, the bearing elements 35 and 36 are adapted to be held in rigid connection with the connector or spacer-block 37 to provide a unitary bearing for the end gudgeons of two alined top-rolls such as 5 and 15 or 6 and 16.

The unitary bearings are assembled on the rod 22 of the cap-bar 11 by sliding the rod through the bores in the spacer-block 37 and the elements 35 and 36; it being understood that the spacer-block 37 is of such length as to maintain the bearing elements spaced apart a distance equal to the diameter of the end gudgeons 5a and 15a of the top-rolls 5 and 15 or the gudgeons 6a and 16a of the top-rolls 6 and 16, so that they straddle the gudgeons in the form of open bearings therefor. After the assembled parts of the bearings have been slid onto the rod 22 in position to accommodate the several gudgeons of the top-rolls 5, 6, 15 and 16 they are secured in place by tightening the set-screw 43 to bind it against the top of the rod. This binding action of the set-screw 43 against the rod 22 will exert pressure on the rod which is transmitted against the bottom of the split bushings 38 and 39 to cause the sides thereof to expand against the interior of the bores 45 and 46 in the elements 35 and 36. It has been determined that this expansion of the split bushings 38 and 39 within the bores 45 and 46 effects an exceedingly strong and secure connection between the bearing elements 35 and 36 and the block 37 whereby to prevent release of the bearing elements. In this way the assembled bearing elements 35 and 36 with their connector or spacer-block 37 are securely held in rigid connection and firmly bound to the rod 22 to prevent any displacement thereof.

By the present improved construction a relatively simple yet substantial form of oilless bearing is provided for the end gudgeons of the several top-rolls to rotatively support them in connection with the cap-bars 11 with their peripheries in cooperative relation to the bottom rolls. The present improved bearing constructed from the preferred material hereinbefore referred to thus provides substantially frictionless, long-wearing bearing faces which are renewable by substitution or interchange of the bearing elements. The bearings are readily attachable to cap-bars of conventional type and may be applied thereto without the use of special tools. All that is required to attach the bearing units to the extension rod of the cap-bar is to slide them in place thereon and secure them in position by means of the set-screws. Similarly, when it is required to renew worn bearings it is only necessary to replace the bearing elements 35 and 36 by assembling them with the spacer-blocks 37 in the manner as previously explained. While the bearing elements 35 and 36 are herein shown as having the corners at the ends of their outer faces chamfered or rounded over, these corners may be left square so that instead of replacing the elements 35 and 36 they may be reversed in position; that is, turned around with their outer faces abutting the ends of the block 37 to provide for further extended use.

If preferred, the bearing elements may be constructed with cores of brass or other metal faced with nylon strips applied as laminations, see Fig. 7 of the drawing. It thus will be observed that the present invention provides a novel form of bearing for the cap-bars of spinning frames or the like and also adapted for use on other types of machines. Moreover, the improved bearing is adapted for most convenient application to use and readily removable for replacement or interchange of the bearing elements.

While the invention is herein shown as particularly adapted for use on the cap-bars of conventional spinning frames or like machines, it is to be understood that variations may be made in the form and structure of the parts of the bearing unit to adapt it for other applications falling within the purview of the invention. Moreover, the separators or spacer-blocks may be made of different dimensions in accordance with variations in the size of the gudgeons or other rotary elements employed in the bearings. For example, the separator blocks may be made either shorter or longer to space the bearing elements or end blocks closer together for smaller gudgeons or wider apart for larger ones; and further, the blocks may be made of different widths to provide for different spacing between the ends of the roll-gudgeons in accordance with variations in the longitudinal separation of the rolls in the machine. Without limiting ourselves to the exact shape and structure of the parts of the improved bearing as herein shown, we claim:

1. A bearing for the cap-bars of spinning or like machines comprising a spacer-member bored to receive the extension-rod of a cap-bar and having bushings projecting from its ends, a pair of bearing elements bored to receive the bushings on the spacer-member, and means for securing said bearing elements in place on the bushings and fastening the unitary bearing to the extension rod of the cap-bar.

2. In combination with the cap-bar of a spinning or like machine, said cap-bar comprising a longitudinally-extending rod, a spacer-member bored to receive said rod for mounting it thereon, said spacer-member having split bushings extending from its opposite ends, a pair of bearing elements bored to receive the bushings on the spacer-member, and a set-screw threaded through the spacer-member for engagement with the extension rod of the cap-bar, said set-screw acting to expand the bushings in the bores of the bearing elements to secure said elements in place on the spacer-member and to bind said spacer-member to the rod to fasten the unitary bearing in fixed position thereon.

3. A bearing unit for the cap-bars of spinning frames and like machines, said cap-bars having longitudinally-projecting extension rods, said bearing unit comprising a spacer-block with bushings projecting from its ends, said block and bushings being slotted on the under side, a pair of bearing elements bored to receive said bushings and having keys in their bores for engagement with the slots therein, and a set-screw threaded through the block for engagement with the extension rod on a cap-bar, said set-screw binding against the rod to exert pressure for expanding the bushings to bind them in the bores of the bearing elements to secure the parts in unitary assembled relationship on the rod.

4. A bearing for the cap-bars of spinning frames and like machines, said cap-bars having extension rods, said bearing comprising a spacer-block bored to receive the extension rod and having projecting bushings at its ends with a slot extending through the bottom of the bushings and the block, a pair of bearing elements in the form of relatively flat blocks bored transversely to receive the bushings at the ends of the spacer-block and formed with keys in the bores engaging the slots in the bushings, and a set-screw threaded through the block for engagement with the extension rod of a cap-bar to secure the bearing in place thereon and bind the bushings in the bores in the bearing elements to fixedly hold them in assembled relation with the spacer-block.

5. In a cap-bar assembly, the combination with the cap-bar arm provided with an extension rod projecting from its end, of a unitary bearing for the end gudgeons of the top-rolls of a spinning frame or like machine, said bearing comprising a spacer-member bored to receive the extension rod of the cap-bar and provided with split bushings projecting from its ends, a pair of relatively flat bearing blocks bored to receive the bushings on the spacer-block and formed with keys in the bores thereof for engagement with the slots in the bushings, and a set-screw threaded through the block for engagement with the extension rod of the cap-bar to bind the block in place thereon while acting to cause the rod to expand the bushings in the bores of the bearing elements to fixedly secure said elements to the spacer-block.

6. In a bearing unit for spinning and like machines having cap-bars with extension rods projecting therefrom, the combination of a central spacer-member of block-like form having means projecting from its opposite ends, said spacer-member provided with a bore for receiving the extension rod projecting from a cap-bar, a pair of separate bearing elements so constructed and arranged as to engage with said projecting-means at the ends of the spacer-member to support them thereon, and means for fixedly securing said bearing elements to said projecting-means to maintain them in spaced-apart relationship.

LOUIS M. COTCHETT.
ROBERT RULON-MILLER.

REFERENCES CITED

The following references are of record in the file of this patent:

UNITED STATES PATENTS

| Number | Name | Date |
| --- | --- | --- |
| 1,094,697 | Blanchard | Apr. 28, 1914 |
| 1,182,165 | Goldsmith | May 9, 1916 |
| 1,539,310 | Helland | May 26, 1925 |
| 2,237,004 | King | Apr. 1, 1941 |
| 2,246,086 | Austin | June 17, 1941 |